(12) United States Patent
Muthukrishnan et al.

(10) Patent No.: US 11,994,963 B2
(45) Date of Patent: May 28, 2024

(54) DYNAMIC HIERARCHICAL PLACEMENT OF CONSOLIDATED AND PLUGGABLE DATABASES IN AUTONOMOUS ENVIRONMENTS

(71) Applicant: Oracle International Corporation, Redwood Shores, CA (US)

(72) Inventors: Nagarajan Muthukrishnan, Foster City, CA (US); Binoy Sukumaran, Foster City, CA (US); Garret F. Swart, Palo Alto, CA (US); Sumanta Chatterjee, Fremont, CA (US); Ravi Shankar Thammaiah, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 186 days.

(21) Appl. No.: 17/577,729

(22) Filed: Jan. 18, 2022

(65) Prior Publication Data
US 2023/0229573 A1 Jul. 20, 2023

(51) Int. Cl.
*G06F 11/20* (2006.01)
*G06F 9/455* (2018.01)
*G06F 16/21* (2019.01)

(52) U.S. Cl.
CPC ...... *G06F 11/2025* (2013.01); *G06F 9/45558* (2013.01); *G06F 11/2041* (2013.01);
(Continued)

(58) Field of Classification Search
CPC .............. G06F 11/2025; G06F 16/217; G06F 9/45558; G06F 11/2041; G06F 2009/4557;
(Continued)

(56) References Cited

U.S. PATENT DOCUMENTS 9,424,094 B2 * 8/2016 Cardosa ................ G06F 9/5094
10,268,513 B2 * 4/2019 Jackson ................ G06F 9/5016
(Continued)

FOREIGN PATENT DOCUMENTS

CN 104951425 A 9/2015

OTHER PUBLICATIONS

Talebian et al., "Optimizing Virtual Machine Placement in IaaS Data Centers: Taxonomy, Review and Open Issues", Springer Nature 2019, https://doi.org/10.1007/s10586-019-02954-, dated Jun. 2019, 42 pages.
(Continued)

*Primary Examiner* — Evan Aspinwall
(74) *Attorney, Agent, or Firm* — Hickman Becker Bingham Ledesma LLP; Brian Miller

(57) ABSTRACT

Herein are resource-constrained techniques that plan ahead for resiliently moving pluggable databases between container databases after a failure in a high-availability database cluster. In an embodiment that has a database cluster that hierarchically contains many pluggable databases in many container databases in many virtual machines, a computer identifies many alternative placements that respectively assign each pluggable database instance (PDB) to a respective container database management system (CDBMS). For each alternative placement, a respective placement score is calculated based on the PDBs and the CDBMSs. Based on the placement scores of the alternative placements, a particular placement is selected with a best placement score that indicates optimal resilience for accommodating adversity such as failover and overcrowding.

18 Claims, 10 Drawing Sheets

(52) U.S. Cl.
CPC .... *G06F 16/217* (2019.01); *G06F 2009/4557* (2013.01); *G06F 2009/45583* (2013.01); *G06F 2201/815* (2013.01)

(58) Field of Classification Search
CPC ..... G06F 2009/45583; G06F 2201/815; G06F 9/445; G06F 9/45533; G06F 11/1484; G06F 2009/45575; H04L 67/10; H04L 41/5022; H04L 43/045; H04L 43/062; H04L 43/0876
USPC .......................................... 707/782; 717/103
See application file for complete search history.

(56) References Cited

U.S. PATENT DOCUMENTS

| | | | |
|---|---|---|---|
| 10,348,565 | B2 | 7/2019 | Kannan et al. |
| 11,336,519 | B1* | 5/2022 | Greenwood ........ H04L 41/0816 |
| 2003/0154236 | A1 | 8/2003 | Dar |
| 2005/0038831 | A1 | 2/2005 | Souder |
| 2005/0198102 | A1 | 9/2005 | Hahn et al. |
| 2008/0016123 | A1 | 1/2008 | Devraj et al. |
| 2011/0126197 | A1 | 5/2011 | Larsen |
| 2012/0173717 | A1 | 7/2012 | Kohli |
| 2014/0007097 | A1* | 1/2014 | Chin .................... G06F 9/5077 718/1 |
| 2016/0014038 | A1 | 1/2016 | Thyagarajan |
| 2016/0036623 | A1 | 2/2016 | Clarkson |
| 2016/0094406 | A1 | 3/2016 | Phan |
| 2016/0321588 | A1* | 11/2016 | Das ..................... G06F 11/3442 |
| 2017/0116235 | A1 | 4/2017 | Yam et al. |
| 2017/0373940 | A1* | 12/2017 | Shahab ................ G06F 9/5083 |
| 2018/0096252 | A1 | 4/2018 | Fagundes |
| 2018/0137139 | A1 | 5/2018 | Bangalore |
| 2019/0102384 | A1 | 4/2019 | Hung |
| 2019/0102411 | A1 | 4/2019 | Hung et al. |
| 2019/0377611 | A1* | 12/2019 | Khan .................. G06F 9/5038 |
| 2020/0104375 | A1* | 4/2020 | Earnesty, Jr. ......... G06F 16/214 |
| 2021/0096927 | A1* | 4/2021 | Zhu ...................... G06F 11/301 |

OTHER PUBLICATIONS

Masdari et al., "An Overview of Virtual Machine Placement Schemes In Cloud Computing", Journal of Network and Computer Applications, http://dx.doi.org/10.1016/j.jnca.2016.01.011, dated Jan. 2016, 34 pages.

Alashaikh et al., "A Survey on the Use of Preferences for Virtual Machine Placement in Cloud Data Centers", https://arxiv.org/pdf/1907.07778.pdf, dated Jan. 16, 2020, 40 pages.

Zisman et al., "An approach to interoperation between autonomous database systems", Distrib. Syst. Engng 6 (1999) 135-148. Printed in the UK, 15 pages.

Yu et al., "Intelligent Database Placement in Cloud Environment," 2012 IEEE 19th International Conference on Web Services, 2012, pp. 544-551.

Weishar et al., "An Intelligent Heterogeneous Autonomous Database Architecture for Semantic Heterogeneity Support", IEEE Workshop on Interoperability in Multidatabase Systems, dated Apr. 1991, 9 pgs.

Pavlo, "Self-Driving Database Management Systems", 8th Biennial Conference on Innovative Data Systems Research (CIDR '17), Jan. 8-11, 2017, Chaminade, California, USA, 6 pages.

Maenhaut et al., "Design and Evaluation of a Hierarchical Multi-Tenant Data Management Framework for Cloud Applications", dated 2015, 6 pages.

Gey et al., "Evolving Multi-tenant SaaS Applications through Self-Adaptive Upgrade Enactment and Tenant Mediation", SEAMS'May 16-17, 16, 2016, Austin, TX, USA 2016 AC, 7 pages.

Das et al., "Scalable and Elastic Transactional Data Stores for Cloud Computing Platforms", dated Dec. 2011, 302 pages.

Das et al., "Automated Demand-Driven Resource Scaling in Relational Database-as-aService", SIGMOD'16, Jun. 26-Jul. 1, 2016, San Francisco, CA, USA, 12 pages.

Agrawal et al., "Database Scalability, Elasticity, and Autonomy in the Cloud", dated 2011, 14 pages.

* cited by examiner

FIG. 4

COST FORMULA 401

$$OCPU\_new_{[cdb, vm]} = MAX(OCPU_{[cdb, vm]}, MAX(1^{st}/2^{nd} \text{ failover OCPUs for active and failover PDBs}))$$

COST FORMULA 402

$$OCPU\_req_{[cdb, vm]} = OCPU\_new_{[cdb, vm]} - OCPU_{[cdb, vm]}$$

COST FORMULA 403

$$OCPU\_req_{[vm]} = \sum OCPU\_req_{[cdb, vm]}$$

COST FORMULA 404

$$CLUSTER_{ocpu\_req} = \sum OCPU\_req_{[vm]}$$

FIG. 5

CONSTRAINT FORMULA 501

$$\sum OCPU[cdb, vm] \leq OCPU[vm]$$

CONSTRAINT FORMULA 502

$$\left(\sum OCPU[pdb, cdb, vm]\right) + CDB\_IDLE\_OCPU \leq OCPU[cdb, vm]$$

CONSTRAINT FORMULA 503

$$\sum OCPU[pdb, cdb, vm] * FO1[pdb]) + CDB\_IDLE\_OCPU \leq OCPU[cdb, vm]$$

CONSTRAINT FORMULA 504

$$\sum OCPU[pdb, cdb, vm] * FO2[pdb]) + CDB\_IDLE\_OCPU \leq OCPU[cdb, vm]$$

FIG. 6

DENSITY FORMULA 601

$$active\_density[vm] = (\sum OCPU[pdb, vm])/OCPU[vm]$$

DENSITY FORMULA 602

$$cluster\_density = (\sum active\_density[vm])/vm\_count$$

DENSITY FORMULA 603

$$burst\_max[cdb, vm] = min(OCPU[cdb, vm] * burst\_factor[cdb], \sum (OCPU[vm, pdb] * burst\_factor[pdb]))$$

DENSITY FORMULA 604

$$bursting\_density[vm] = (\sum burst\_max[cdb, vm])/(BURST\_FACTOR\_DEFAULT * OCPU[vm])$$

DENSITY FORMULA 605

$$min(OCPU[vm], (\sum burst\_max[cdb, vm]))$$

FIG. 7

SCORING FORMULA 701

$$Resilience\_index_{[pdb, vm\_cur, vm1\_down]} = $$

$$\frac{(OCPU\_red_{[pdb, vm\_cur, vm1\_down]} - OCPU\_int_{[pdb, vm\_cur, vm1\_down]})}{OCPU\_active_{[pdb, nactive]}} \%$$

SCORING FORMULA 702

$$Plindex = w1 * active\_density\_deviation + w2 * bursting\_density\_deviation + w3 * cluster\_ocpu\_req + w4 * resilience\_index$$

COMBINATORICS FORMULA 703

$$\# without\ splits = {_8}P_3 = 336$$

COMBINATORICS FORMULA 704

$$\# with\ splits = nCp + nCp * (n-p)P1 + nCp * (n-p)P2$$

US 11,994,963 B2

DYNAMIC HIERARCHICAL PLACEMENT OF CONSOLIDATED AND PLUGGABLE DATABASES IN AUTONOMOUS ENVIRONMENTS

RELATED CASE

Incorporated herein in its entirety is related U.S. patent application Ser. No. 17/334,360 "Resilience Based Database Placement In Clustered Environment" filed May 28, 2021 by Nagarajan Muthukrishnan et al.

FIELD OF THE DISCLOSURE

This disclosure relates to high availability for a database cluster. Presented herein are resource-constrained techniques that plan ahead for resiliently placing and moving pluggable databases between instances of container database(s) after a failure or planned reconfiguration in the database cluster.

BACKGROUND

In clustered environments such as datacenter(s) or a computer cloud, there can be multiple container databases and pluggable databases placed inside various host computers and virtual machines that are part of a database cluster. These virtual machines, computers, and container databases are likely to have service outages that are expected, such as a software upgrade, or unexpected such as a failure. An outage necessarily includes pluggable databases that should fail over to other hosts or containers in the cluster for high availability.

In autonomous cloud environments, many pluggable databases can be collocated in a same container database such as according to a customer specific isolation requirement. When a failover occurs, surviving hosts and containers will take over hosting of pluggable databases struck by the failure so that the database cluster continue to provide the services. Imbalanced resource distribution caused by failing over can lead to severe operational and performance problems that may cascade into a chain reaction of failures to multiple components and computers.

There are various approaches used in the industry based on typically rigid and simplistic heuristic reconfiguration algorithms. Reconfiguration decisions made by such an algorithm tend to be suboptimal in terms of maximizing cluster-wide performance of pluggable databases by maximizing usage and availability of computer resources such as processing bandwidth and memory. That is because, in clustered environments having multiple container databases, optimal placement of pluggable databases is a very hard combinatoric problem due to many provisioning constraints to satisfy. This optimization problem is further hindered by lack of a single scalar metric to which optimization may be dedicated. For example, if two alternate configurations both satisfy the provisioning constraints, there may be no way to detect which configuration is better. Without such a decision criterion, selecting an optimal configuration from many sufficient configurations may be more or less impossible. Thus, typical approaches select a suboptimal configuration that underutilizes (i.e. wastes) or overloads computer resources, thereby increasing database latencies and decreasing system throughput in the database cluster.

BRIEF DESCRIPTION OF THE DRAWINGS

In the drawings:

FIG. 4 depicts example mathematical cost formulae for calculating how many fractions of a central processing unit (CPU) core does an alternative placement need to support all pluggable databases and container database management systems (CDBMSs);

FIG. 5 depicts example mathematical constraint formulae for automatically disqualifying alternative placements that are infeasible or undesirable;

FIG. 6 depicts example density formulae for calculating processor utilization;

FIG. 7 depicts example formulae for calculations that facilitate generation and comparison of alternative placements;

DETAILED DESCRIPTION

Figure 1:
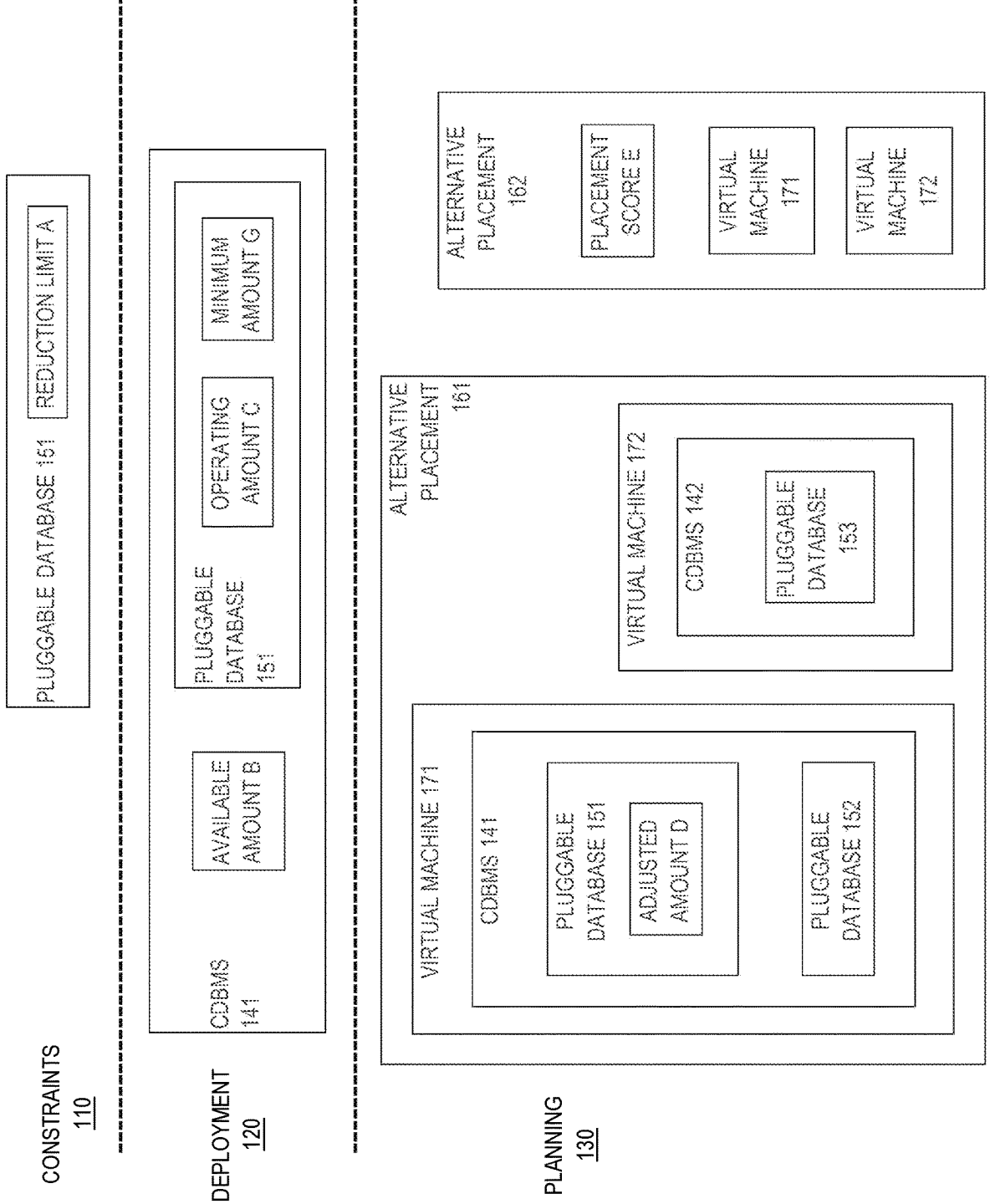
FIG. 1 is a block diagram that depicts an example high-availability database cluster that contains pluggable databases and instances of container database(s)

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are techniques that translate placement and/or failover requirements into a placement score for optimizing placement of pluggable databases into instances of container database(s). Under normal operating circumstances, the pluggable databases are more or less guaranteed a commitment of computer resources, such as a number of processor cores or an amount of memory. When failover happens in a database cluster, computer resource commitments for running pluggable databases are decreased to fit displaced pluggable databases into possibly fewer surviving instances of container database(s). One goal during placement of pluggable databases may be to find an optimal place for a new pluggable database or an optimal relocating of many or all pluggable databases so that the impact of a future failure in the cluster can be minimized. In an embodiment, a container database is distributed and has multiple instances that may contain same or different metadata and same or different pluggable databases.

Herein, forecasted impact of a future failure is measured as a placement score that is a novel numeric scalar. Placement scores behave in ways that facilitate optimal resource allocation in a database cluster. For example, placement scores are calculated from composable placement costs such as a placement cost of an instance of a container database that may be calculated solely based on the respective placement costs of the pluggable databases contained in the instance of the container database. Likewise, multiple placement scores may be directly compared as numbers so that respective placement scores of alternate configurations may be ranked to select a best configuration with a highest placement score.

In an embodiment, a placement score is based on a percent reduction of an amount of a computer resource that had been committed or otherwise provided to a pluggable database, such as an amount of random access memory (RAM) or a fractional amount of a processor core. A failover may cause a chain reaction of cascading failures that spread across the database cluster, in which case pluggable databases may be repeatedly displaced from failing instances of container databases to surviving container database instances, and decreasing resilience scores may be repeatedly recalculated. In an embodiment, potential failures are proactively anticipated and placement scores are predictions as to respectively how well suited are alternate configurations for absorbing the impact of failures.

Optimization approaches herein maximize placement scores based on powerful techniques such as linear or non-linear programming and bin packing. Such placement optimization increases utilization of computer resources, thereby decreasing database latencies and increasing system throughput in the database cluster. Because calculating placement scores is arithmetically more efficient than other ways of comparing and ranking configurations, more compute time is available for related important tasks such as generating alternate configuration proposals that is combinatorically intensive.

In an embodiment that has a database cluster that hierarchically contains many pluggable databases in many container databases in many virtual machines, a computer identifies many alternative placements that respectively assign each pluggable database instance (PDB) to a respective container database management system (CDBMS). For each alternative placement, a respective placement score is calculated based on the PDBs and the CDBMSs. Based on the placement scores of the alternative placements, a particular placement is selected with a best placement score that indicates optimal resilience for accommodating adversity such as failover and overcrowding.

1.0 Example Database Cluster

FIG. 1 is a block diagram that depicts an example high-availability database cluster that contains container database management systems (CDBMSs) 141-142 and pluggable databases 151-153, in an embodiment. The database cluster applies resource-constrained techniques that plan ahead for resiliently moving any of pluggable databases 151-153 between CDBMSs 141-142 after failover. As discussed later herein, the database cluster contains virtual machines 171-172 and, although not shown, networked computers that host virtual machines 171-172.

In an embodiment, CDBMSs 141-142 host separate instances of a same multi-instance container database, in which case CDBMSs 141-142 may at different times contain same or different metadata and same or different pluggable databases. In an embodiment, CDBMSs 141-142 may contain respective instances of a same pluggable database such as for horizontal scaling or failover. In an embodiment, pluggable databases 151-153 are instances of same or different multi-instance pluggable databases. In an embodiment, multiple instances of a same pluggable database contain different respective subsets of data such as shards for horizontal partitioning such as for acceleration or for distributed storage of more data than one instance of a pluggable database can store. In an embodiment, perfect replicas of a same pluggable database provide horizontal scaling such as for elastic scaling and/or online analytical processing (OLAP).

In an embodiment, one or some instances of a same pluggable or container database operate as primaries and one or some instances of the same database operate as standbys that may become primaries after failover such as for online transaction processing (OLTP). In an embodiment as discussed later herein, a multi-instance database may experience a sequence of multiple failovers. In an embodiment, standby instances are online for more or less continuous synchronization from primary instances. In an embodiment, standby instances are instead offline (i.e. idle) and do not consume processor bandwidth until activated by failover. In an embodiment for scaling or failover, database instances can share data files in a cross-mounted filesystem.

1.1 Cluster Administration

FIG. 1 is logically divided into three temporal layers 110, 120, and 130 that represent different ways of inspecting and configuring CDBMSs 141-142 and pluggable databases 151-153. Constraints 110 specifies time-invariant design constraints that the database cluster should never violate. Constraints 110 specifies more or less rigid requirements for computer resource(s) such as nonvolatile storage, random access memory (RAM), nonvolatile cache such as flash memory, network bandwidth, disk bandwidth, and/or a fraction of a processor core of a central processing unit (CPU). In an embodiment, the fraction of the processor core may be less than ten percent such as one percent.

In an embodiment, the fraction is of a processor core that does not reside: a) in any virtual machine in the database cluster, b) in the database cluster, and/or c) in any computer that hosts any virtual machine in the database cluster. For example, the fraction may be of a processor core in a remote storage computer that provides persistence for the database cluster and provides some filtration and/or projection of database data such as with a so-called smart scan.

As discussed later herein, pluggable database 151 may move between CDBMSs 141-142 so long as sufficient resources are available. An embodiment may have multiple multi-instance container databases such as five container database instances of which two are instances of one container database and the remaining three are instances of another container database. In an embodiment, movement of an instance of a pluggable database is restricted to moving between instances of a same container database.

As discussed later herein, moving pluggable database 151 from an overutilized container database to an underutilized container database may provide more of a computer resource such as memory to pluggable database 151. Likewise, moving another pluggable database into a same container database as pluggable database 151 may provide less of the resource to pluggable database 151. For example due to movement of pluggable database 151 and/or other pluggable database(s), memory allocated to pluggable database 151 may be reduced by a percent such as five or fifty.

1.2 Resource Limitations

Depending on the magnitude of the reduction, pluggable database 151 may or may not tolerate the reduction. For example, insufficient memory may cause a malfunction or crash of pluggable database 151, which may have various consequences such as inadequate quality of service (QoS), failed transaction(s), lost or corrupted data, and loss of service. In other words, the database cluster should be careful to avoid movement of a pluggable database that would deny that or another pluggable database sufficient resources for healthy operation. To maintain sufficient resources for all pluggable databases, each pluggable database has a respective specified reduction limit for a resource that should never be violated.

For example as shown, an amount of a resource provided to pluggable database 151 should never be decreased by more than reduction limit A, such as a maximum reduction of 20% of a memory allocation. Reduction limit A is a relative quantity and not a minimum absolute amount of a resource. For example as discussed later herein, when reduction limit A is 50% for processor cores, whether a minimum absolute amount of processor cores is 1.1 or 0.1 depends on whether pluggable database 151 currently (i.e. before reduction) has 2.2 or 0.2 processor cores.

As discussed later herein and although reduction limit A is a relative amount such as a percent, reduction limit A may be derived from a minimum absolute amount of a resource. Alternatively, the minimum absolute amount of a resource may be derived from reduction limit A. For example, a service level agreement (SLA) may specify either reduction limit A or the minimum absolute amount.

Although not shown, pluggable database 151 may have a same or respective reduction limit for other resources such as disk space and RAM. Although not shown, each of pluggable databases 151-153 may have a respective reduction limit for a same resource. In an embodiment, the database cluster contains at least two thousand instances of pluggable databases, and each multi-instance pluggable database has its own reduction limit that should be enforced for one or multiple resources.

1.3 Container Database

Although not shown, each of CDBMSs 141-142 contains a respective container database that may or may not be instances of same or different multi-instance container databases. As shown in planning 130, CDBMS 141 and its container database contain pluggable databases 151-152. Deployment 120 reflects the actual configuration of a live production environment in which CDBMSs 141-142 and pluggable databases 151-153 are currently operating. CDBMS 141 has resources that it shares amongst the pluggable database(s) that CDBMS 141 contains. For example as shown, CDBMS 141 has available amount B of a resource that CDBMS 141 can provide to the pluggable database(s) that CDBMS 141 contains. For example, available amount B may be one processor core. Although not shown, CDBMS 141 may have respective available amounts of other resources. Although not shown, deployment 120 may or may not also contain CDBMS 142 that also has a respective available amount of resource(s).

CDBMS 141 need not share its resources equally amongst its multiple pluggable databases. Instead, CDBMS 141 is configured to share its resources according to need based on the reduction limits for the pluggable databases that CDBMS 141 contains. Pluggable database 151 is not deployed into CDBMS 141 unless CDBMS 141 has available amount B of a resource that is sufficient to satisfy both of the following two conditions. The first conditions is that a resource reduction not exceed reduction limit A of the resource for pluggable database 151. The second condition is that a resource reduction not exceed respective reduction limits for the resource to other pluggable databases that CDBMS 141 contains.

As explained elsewhere herein, a minimum amount of a resource for pluggable database 151 may be calculated based on pluggable database 151's current amount of the resource and reduction limit A. Thus, each of pluggable databases 151-153 may need a respective minimum amount of a resource based on a respective reduction limit for the resource. Available amount B may exceed the combined minimum amounts needed by the pluggable databases that CDBMS 141 contains, in which case CDBMS 141 has a surplus of the resource that may or may not be provided to one, some, or all of the pluggable database(s) that CDBMS 141 contains.

For example as shown, pluggable database 151 may currently be provided operating amount C of the resource that may be more than a minimum amount of the resource needed by pluggable database 151, which increases the performance of pluggable database 151. For example, increasing the processor core fraction or RAM provided to pluggable database 151 may decrease the latency and/or increase the throughput of pluggable database 151. The increase may facilitate pluggable database 151 accepting more database connections to provide more database sessions to serve more clients. Herein, an operating amount is also known as a current amount.

In various embodiments, various other amounts may be calculated for pluggable database 151 in deployment 120 based on reduction limit A and operating amount C. For example, there may be a maximum reduction that is an absolute amount of reduction of a resource that pluggable database 151 can tolerate. In an embodiment, the maximum reduction is the multiplicative product of operating amount C times reduction limit A. For example, when operating amount C is 1.2 processor cores and reduction limit A is 33%, then the maximum reduction is 1.2×33%=0.4, which means that pluggable database 151 can tolerate losing at most 0.4 processor cores.

Likewise, minimum amount G is the least amount of the resource that pluggable database 151 can tolerate. In an embodiment, minimum amount G is the subtractive difference of operating amount C minus the maximum reduction that in this example is 1.2−0.4=0.8, which means that pluggable database 151 should retain at least 0.8 processor cores.

1.4 Example Scenarios

In deployment 120, the database cluster may be in a steady operational state whose configuration is more or less static even though the load on the database cluster may fluctuate. Various scenarios may necessitate or benefit from reconfiguration of some or all of the database cluster. Some scenarios are intended, such as replication of a pluggable database for redundancy or horizontally scaling up or down or adding, removing, or upgrading a computer, virtual machine, or software application that the database cluster hosts. Other scenarios are unintended, such as failure of a pluggable database, a CDBMS, a virtual machine, or a computer that the database cluster hosts. Various scenarios may variously increase, decrease, or not affect a resource. For example, a scenario may entail adding physical RAM to a computer and/or allocating more RAM to a pluggable database, a container database, and/or a virtual machine.

Some intended scenarios are as follows. A pluggable database may be added or removed or replication of a pluggable database may be increased or decreased for elastic horizontal scaling. A reduction limit for resource(s) for a pluggable database may be increased or decreased for vertical scaling such as for peak or off-peak hours. Periodic or scheduled reshuffling of assignments of pluggable databases to container databases may occur for deferred re-optimization based on accumulated changes of configurations or resources that had not immediately caused optimization. For upgrading software of replicas of a container database, a rolling restart of replicas, one at a time, may necessitate movement of pluggable databases during a maintenance window. This approach increases the serviceability and scalability of the database cluster and accelerates routine maintenance of the database cluster.

1.5 Configuration Planning

As explained above, according to available amounts of a resource provided by CDBMSs, combined reduction limits for the resource for pluggable databases may leave a surplus of the resource that, when reconfiguration occurs, provides some freedom as to how the resource is reallocated and which pluggable databases should be moved into which respective container database to better utilize the resource and/or to maximize the reliability of the database cluster. Planning 130 is a temporal phase that optimizes the reconfiguration before the reconfiguration occurs. In a reactive embodiment, planning 130 is deferred until just in time such as when a failure occurs. In a proactive embodiment, planning 130 instead occurs as a precaution such as while the database cluster is without failure.

During planning 130, multiple alternative placements 161-162 are generated as proposed possible rearrangements of the database cluster that include respective movements of some pluggable databases between some container databases. Although not shown, alternative placement 162 may contain same CDBMSs 141-142 and same pluggable databases 151-153 as alternative placement 161 contains. However, none, some, or all of pluggable databases 151-153 may reside in a different CDBMS than as shown in alternative placement 161.

For example, alternative placement 161 may move pluggable database 152 into CDBMS 141, and alternative placement 162 may instead move pluggable database 152 into CDBMS 142 if pluggable database 152 is not already in CDBMS 142. Alternative placements 161-162 may move respective counts of pluggable databases to and from respective counts of container databases. For example, alternative placement 162 may move no pluggable databases or fewer pluggable databases than alternative placement 161 moves. Generation of alternative placements 161-162, as proposals that respect all reduction limits for all resources for all pluggable databases 151-153, is discussed later herein.

During planning 130 and after generating alternative placements 161-162, the following quantitative analytics occur. A respective adjusted amount of a resource is calculated for each of pluggable databases 151-153 in each of alternative placements 161-162 that respectively may be more, less, or the same as the respective operating amounts. For example because alternative placement 161 increases a count of pluggable databases that share resources of CDBMS 141, adjusted amount D of a resource for pluggable database 151 may be less than operating amount C. However, adjusted amount D of a resource for pluggable database 151 should not be less than relative reduction limit A would permit. Adjusted amount D of a resource for pluggable database 151 should not be less than an absolute reduction tolerated would permit. Adjusted amount D of a resource for pluggable database 151 should not be less than a minimum amount for pluggable database 151, and should not be more than absolute available amount B. Although not shown, all of pluggable databases 151-153 in all of alternative placements 161-162 have respective adjusted amounts of resource(s).

As explained earlier herein, each of pluggable databases 151-153 may require its own respective minimum amount of a resource, which does not vary between alternative placements 161-162. Adjusted amount D may exceed a minimum amount for pluggable database 151, such as when CDBMS 141 in alternative placement 161 would have more than enough of a resource to provide to pluggable database 151. In an embodiment, an extra amount is an additional surplus of a resource provided to pluggable database 151 in alternative placement 161, which is the subtractive difference between adjusted amount D minus the minimum amount for pluggable database 151. For example, when adjusted amount D is 0.9 and the minimum amount for pluggable database 151 is 0.8 as discussed earlier herein, then the extra amount for pluggable database 151 is 0.9−0.8=0.1 processor cores. Quantitative analytics based on that extra amount is presented below.

1.6 Placement Score

As explained above, alternative placements 161-162 may be alternative assignments of pluggable databases into CDBMSs that may increase or decrease the reliability and performance of the database cluster as a whole. In other words, alternative placement 161 may or may not be a better arrangement of the database cluster. Such fitness of the database cluster is quantifiable such that each of alternative placements 161-162 may have a respective fitness measurement. For example as shown, alternative placement 162 has placement score E that may be less than, equal to, or greater than the placement score of alternative placement 161.

Placement score E may be automatically calculated based on various kinds of fitness scores that are variously measured for virtual machines 171-172, CDBMSs 141-142, and/or pluggable databases 151-153. Such fitness scores may be hierarchical such that placement score E is calculated from fitness scores of virtual machines 171-172 that are calculated from fitness scores of CDBMSs that are calculated from fitness scores of pluggable databases. Thus, fitness scores of various kinds may rollup in various ways discussed later herein.

1.7 Resilience Score

Examples of kinds of fitness scores are a non-hierarchical score such as a density score as discussed later herein and a hierarchical (i.e. rolls up) score such as a resilience score as follows. As explained above, adjusted amount D may be more or less than operating amount C, which means alternative placement 161 may help or hinder the speed and/or reliability of pluggable database 151. Such impact to the performance of pluggable database 151 may be measured as a resilience score that quantifies how well would pluggable database 151's demand for computer resources be satisfied in alternative placement 161. For example, a low resilience score for pluggable database 151 means that pluggable database 151 is likely to be operationally stressed due to resource scarcity in alternative placement 161, which may cause poor performance of pluggable database 151 such as increased latency or decreased reliability.

In various embodiments, the resilience score of pluggable database 151 in alternative placement 161 is based on one, some, or all of quantities A-D and G and/or other quantities discussed earlier herein. In an embodiment, the resilience score of pluggable database 151 in alternative placement 161 is proportional to the extra amount of a resource allocated to pluggable database 151 in alternative placement 161 and/or adjusted amount D. In an embodiment, a resilience score of a pluggable database in an alternative placement is the ratio of the extra amount of a resource for the pluggable database over the maximum reduction of the resource for the pluggable database. For example, when the extra amount is 0.1 and the maximum reduction is 0.4 as discussed earlier herein, then the resilience score is 0.1/0.4=25%. For a resilience score, 100% would be ideal, and 0% would be barely tolerable.

Forecasted impact of a future failure is measured as a resilience score. Resilience scores behave in ways that facilitate optimal resource allocation in a database cluster. For example, resilience scores are composable so that a resilience score of an instance of a container database may be calculated solely based on the respective resilience scores of the pluggable databases contained in the instance of the container database. Likewise, multiple resilience scores may be directly compared as numbers so that respective resilience scores of alternate configurations may be ranked to select a best configuration with a highest resilience score. Implications of a high or low resilience score are discussed in related U.S. patent application Ser. No. 17/334,360.

Although not shown, same pluggable database 151 has a same or different resilience score in alternative placement 162. For example, pluggable database 151 respectively is or is not collocated with pluggable database 152 and does or does not share resources of CDBMS 141 with pluggable database 152 in alternative placements 161-162, and the resilience score of pluggable database 151 may be higher in one of alternative placement 161 or 162. Although not shown, pluggable databases 152-153 have respective resilience scores in alternative placements 161-162.

Comparison of alternative placements 161-162 based on resilience scores of pluggable databases 151-153 is discussed later herein. Alternative placement 161 may be deemed more resilient than alternative placement 162 based on resilience scores of pluggable databases 151-153. For example, the database cluster may benefit more from alternative placement 161 than from alternative placement 162 based on resilience scores of pluggable databases 151-153, which may cause alternative placement 161 to be selected during, or in anticipation of, various reconfiguration scenarios as discussed later herein.

1.8 Failover

In an embodiment, alternative placement 161 is proactively selected in anticipation of a potential failure that has not occurred. If the failure later occurs, some or all pluggable databases would be moved to CDBMSs as assigned in alternative placement 161. For example, software and data files associated with those pluggable databases may be prepositioned for immediate availability after moving the pluggable databases in response to a failure. This approach increases the reliability and availability of the database cluster and accelerates recovery for the database cluster.

In an embodiment, planning 130 anticipates a sequence of a few failures such as two or more. For example, planning 130 may proactively propose a first set of alternative placements for reconfiguring after a first failure and proactively propose a second set of alternative placements for reconfiguring after both of the first failure and a second failure. As explained earlier herein, reduction limit A of a resource may be defined as a fraction for operating amount C. In an embodiment, the first and second failures may have different respective fractions as respective reduction limits for the resource. For example, a service level agreement (SLA) may specify a sequence of reduction limits or a sequence of absolute minimum resource amounts as discussed earlier herein. For example, the first failure may tolerate operating amount C being reduced by 50%, and the second failure may tolerate operating amount C being reduced instead by 100% that means any reduction, no matter how drastic, is tolerable.

As explained earlier herein, there may be multiple multi-instance CDBMSs and movement of an instance of a pluggable database may be restricted to moving only between instances of a same multi-instance CDBMS. In an embodiment, each multi-instance CDBMS is operated as a separate cluster and planning 130 generates separate respective sets of alternative placements for each cluster. Even when multiple multi-instance container databases operate as separate clusters, various embodiments may or may not host different multi-instance CDBMSs in a same computer or virtual machine as discussed later herein. Due to such infrastructure sharing, a failover or reconfiguration in one cluster may cause planning 130 and/or reconfiguration in the other cluster.

2.0 Placement Selection Process

Figure 2:
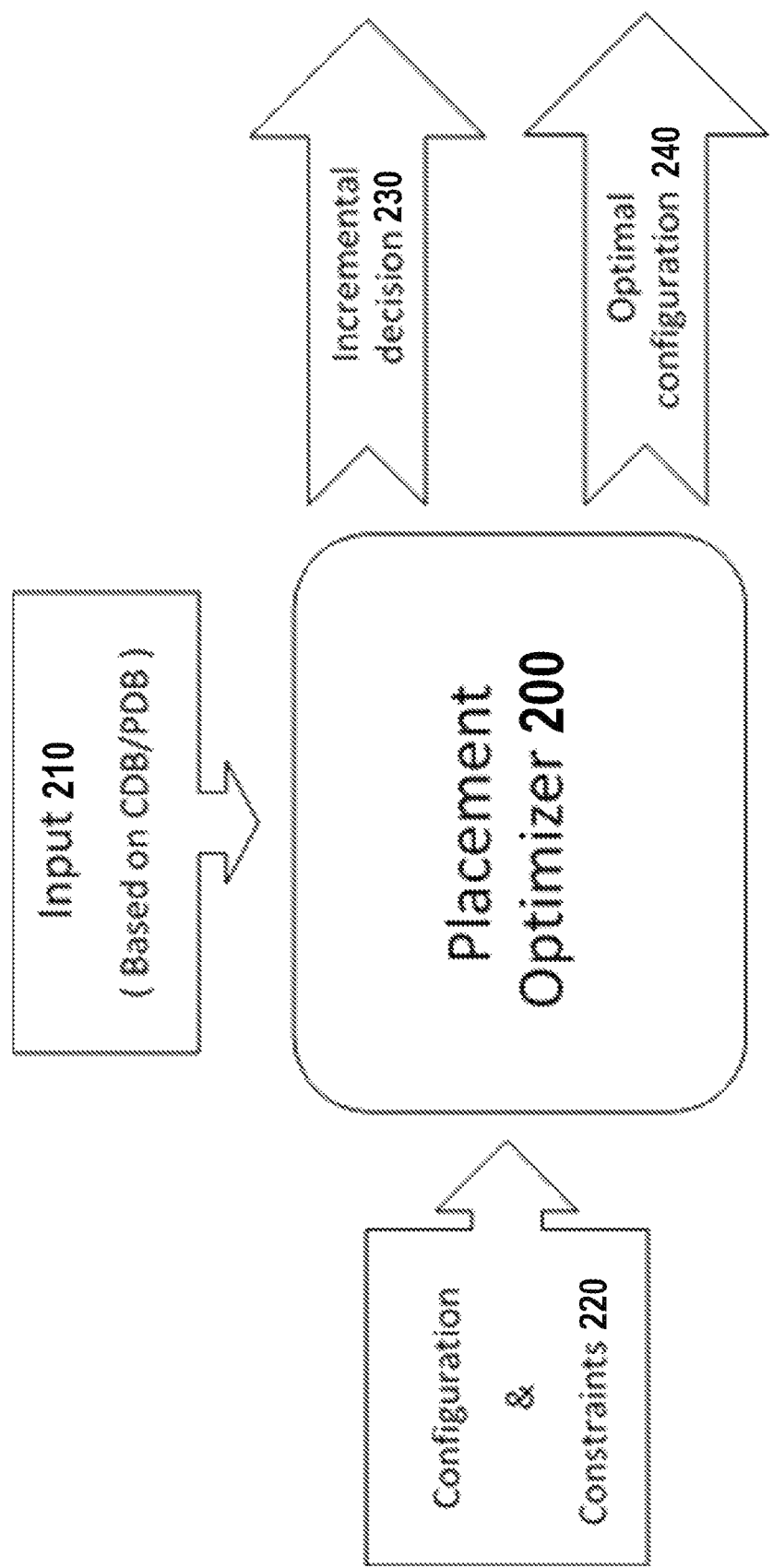
FIG. 2 is a block diagram that depicts an example placement optimizer that may be system control software that plans for rearranging a database cluster.

FIG. 2 is a block diagram that depicts an example placement optimizer 200 that may be system control software that plans for rearranging the database cluster of FIG. 1. For example, placement optimizer 200 may generate alternative placements 161-162. FIG. 2 is discussed with reference to FIG. 1.

Placement optimizer 200 has two mutually exclusive operational modes as indicated by mutually exclusive outputs that are incremental decision 230 and optimal configuration 240. Each of incremental decision 230 and optimal configuration 240 is a selection of a best alternative placement that has a highest placement score. In an unusual example, incremental decision 230 and optimal configuration 240 would select a same alternative placement as best.

In a usual example instead, incremental decision 230 and optimal configuration 240 would select a different respective alternative placement as best, even if placement optimizer 200 were invoked with identical inputs 210 and 220 for the two operational modes. However, such comparison of results of the two operational modes may be demonstrative because placement optimizer 200 in practice is invoked in only one operational mode or the other for a given pair of inputs 210 and 220.

Configuration and constraints 220 is the current arrangement and configuration of CDBMSs and pluggable databases, including quantities A-D and G and/or other quantities discussed earlier herein. Input 210 specifies a pluggable database (PDB) and/or CDBMS to be added, removed, or horizontally or vertically scaled up or down. In other words, input 210 is an adjustment to the database cluster. When placement optimizer is invoked in incremental mode to generate incremental decision 230, input 210 is mandatory. When placement optimizer is invoked in full optimization mode to generate optimal configuration 240, input 210 is optional as explained below.

The goal of incremental mode is to generate only alternative placements that accommodate the change specified by input 210 and that minimize disruption to the existing arrangement within the database cluster. For example when adding a new pluggable database, incremental mode generates only alternative placements that move as few existing pluggable database between CDBMSs as possible. Thus, incremental decision 230 may select an alternative placement that has a lower (i.e. worse) placement score than an alternative placement that would have been generated and selected for optimal configuration 240.

Full optimization mode that provides optimal configuration 240 may generate alternative placements that greatly differ from the existing arrangement within the database cluster. Thus, full optimization mode has more freedom than incremental mode to generate alternative placements that have maximal placement scores. However, reconfiguring for optimal configuration 240 may entail disruptions that temporarily impact quality of service (QoS).

In one scenario, incremental mode is used for reactively or proactively planning for failover. For example, input 210 may indicate a current or potential failover that incremental decision 230 should be able to mitigate as quickly and seamlessly as possible, which may be more important than achieving an absolutely optimal placement with a highest possible placement score.

In another scenario, incremental mode is repeatedly invoked at different times for different purposes. Each incremental invocation of placement optimizer 200 may entail a different input 210 and a different configuration and constraints 220. Each incremental decision 230 may, for expediency as explained above, cause arrangement of the database cluster to increasingly depart from absolute optimality due to repeated incremental invocations. In various embodiments, placement optimizer 200 has one of various kinds of optimization threshold that can be used to decide when repeated incremental invocation has caused too big an accumulated departure from absolute optimality.

For example, the optimization threshold may be: a) a count of incremental invocations since a last full optimization invocation, b) a count of pluggable database instances identified in inputs 210 since a last full optimization invocation, c) a count of pluggable database instances moved or changed in incremental decisions 230 since a last full optimization invocation, d) a minimum placement score for incremental decision 230, or e) a maximum decrease in placement score between two incremental decisions 230 in sequence. When the optimization threshold is crossed, a full optimization invocation is scheduled to occur immediately or eventually. In various embodiments, crossing the optimization threshold variously causes: a) immediate full optimization to occur even though an invocation was requested as incremental or b) full optimization in the background but deferred until the database cluster is idle enough or until midnight. In case (a), full optimization uses input 210. In case (b), full optimization can occur without an input 210.

3.0 Placement Modes

Figure 3:
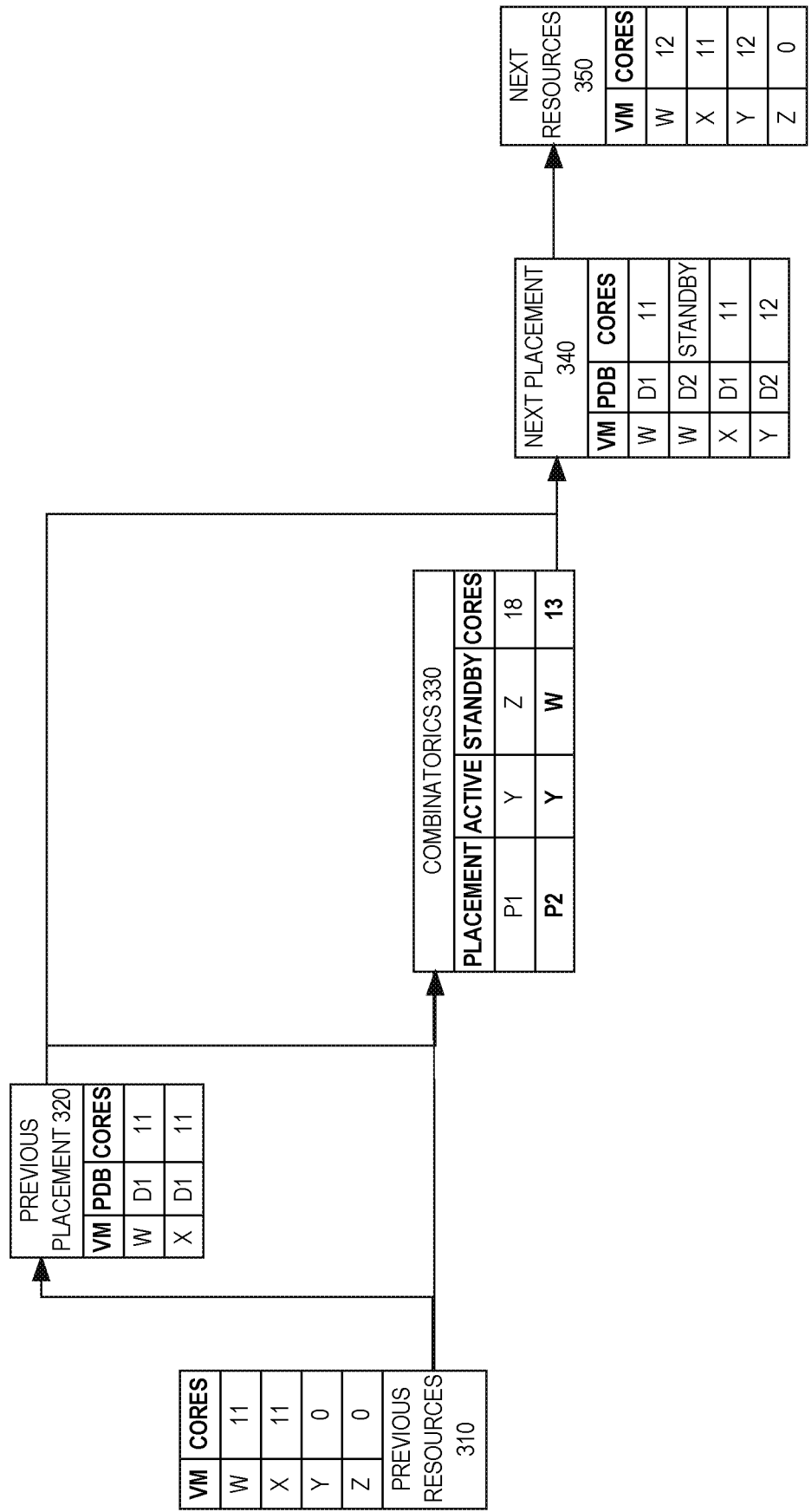
FIG. 3 is a dataflow diagram that depicts example data processing for incremental placement that minimizes allocation of additional resources in ways that have counterintuitive effects.

FIG. 3 is a dataflow diagram that depicts example data processing for incremental placement that minimizes allocation of additional resources in ways that have counterintuitive effects. Unlike a full optimization placement strategy that would greedily maximize load balancing by separating pluggable databases across as many virtual machines as possible, incremental placement may instead arithmetically favor collocation of different pluggable databases in a same virtual machine and/or CDBMS, which may be counterintuitive. Some differences in placement between incremental and full optimization modes may be due to using different mathematical formulae and different optimization (e.g. minimax) criteria respectively for incremental and full optimization modes. Example mathematical formulae are presented later herein.

As shown in previous resources 310, the database cluster contains virtual machines (VMs) W-Z. Each virtual machine may host one or more CDBMSs but, in this example, each virtual machine hosts only one CDBMS. As shown in previous resources 310, each of virtual machines W-X has eleven processor cores available to provide to pluggable databases.

Previous placement 320 reflects the current arrangement of a database cluster, which is an arrangement that: a) does not exceed previous resources 310, b) could be modified to achieve a new arrangement that hosts more pluggable databases, and/or c) requires increasing the resources of some or all of virtual machines W-Z. As shown in previous placement 320, only virtual machines W-X are currently used, and each of virtual machines W-X hosts a respective instance of multi-instance pluggable database (PDB) D1. Pluggable database D1 may have multiple instances for horizontal scaling, for redundant storage, or for sharding.

In this example scenario, rearrangement of the database cluster occurs as follows to accommodate adding new multi-instance pluggable database D2 to be arranged for buddy failover. The two instances of pluggable database D2 have distinct respective roles as active (i.e. primary) and standby. Those roles may be relevant to the resource demands of the two instances of pluggable database D2 when added to the database cluster that occurs as follows.

3.1 Placement Combinatorics

Each row of combinatorics 330 represents a distinct one of alternative placements P1-P2 for multi-instance pluggable database D2. Although not shown, combinatorics 330 may have many more rows for other alternative placements. As a small example, the combinatorics of placing two instances of pluggable database D2 into separate virtual machines of four virtual machines W-Z is 4!/2!=twelve. Factorial complexity is comparable to exponential complexity. Thus in practice, combinatorics 330 may have many rows.

In this incremental example, already placed multi-instance pluggable database D1 will not be moved, although its resources might be decreased. Planning to accommodate new multi-instance pluggable database D2 entails generating twelve alternative placements, scoring those placements, and selecting the placement that has the best placement score. In this example, a placement score is a count of additional processor core fractions needed beyond the processor cores already provided by previous resources 310. In this example, the lowest placement score is the best score.

Both instances of pluggable database D1 and the standby instance of pluggable database D2 have a reduction limit of 50%, which means that their allocated processor core fractions may be reduced by half if needed to accommodate one failover of multi-instance pluggable database D2. A processor core fraction of one is unitary and cannot be divided. Thus, half of eleven processor core fractions is rounded up to six.

3.2 Incremental Placement

In this example, the active instance of pluggable database D2 needs twelve processor core fractions and, after failover, the surviving standby instance of pluggable database D2 would only need 12×50%=six processor core fractions. For example as shown, placement P1 places the active and standby instances of pluggable database D2 into respective virtual machines Y-Z that currently provide zero resources but would need to be increased such that virtual machine Y provides twelve processor core fractions for the active instance of pluggable database D2 before failover and such that virtual machine Z provides six processor core fractions for the standby instance of pluggable database D2 after failover. Thus, placement P1 needs allocation of an additional 12+6=eighteen processor core fractions as shown. Thus, the incremental placement cost of placement P1 is eighteen.

Placement P2 is counterintuitive because it shows that collocation of different pluggable databases in a same virtual machine has a lower incremental placement cost and thus is less disruptive than placement P1. Placement P1 may be disruptive because it may require many additional processor core fractions to be allocated to virtual machines and/or CDBMSs. Unlike placement P1, placement P2 collocates the standby instance of pluggable database D2 with one instance of pluggable database D1 in virtual machine W.

After failover of pluggable database D2, the standby instance of pluggable database D2 would have a decreased need of six processor core fractions. Likewise after that failover of pluggable database D2, the instance of pluggable database D1 in virtual machine W would also have a decreased need of six processor core fractions. Thus for placement P2 after failover, virtual machine W would need to provide 6+6=twelve processor core fractions, of which virtual machine W already provides eleven processor core fractions.

Thus, virtual machine W in placement P2 needs only 12−11=one additional processor core fraction. As explained above, in both placements P1-P2, virtual machine Y would need twelve additional processor core fractions. Thus placement P2 needs, in total, 12+1=thirteen additional processor core fractions as shown. Thus as shown, placement P2 has a lower/better incremental placement score, and placement P2 is selected for adding new multi-instance pluggable database D2 to the database cluster.

As explained above, selected placement P2 only arranges new multi-instance pluggable database D2 but not existing multi-instance pluggable database D1 that is not moved. As shown, new placement 340 is the result of imposing partial placement P2 onto previous placement 320. New placement 340 shows that the standby instance of pluggable database D2 in virtual machine W needs no resources because the standby instance is inactive until failover.

Next resources 350 shows resources allocated in the database cluster to accommodate next placement 340. Comparing resources 310 and 350 shows that resources provided by virtual machines X and Z are unchanged and resources provided by virtual machine W is increased only by one, which minimizes disruption.

4.0 Example Cost Formulae

FIG. 4 depicts example mathematical cost formulae 401-404 for calculating how many fractions of a central processing unit (CPU) core does an alternative placement need to support all pluggable databases and CDBMSs. Herein a smallest fraction of a CPU core is referred to as an OCPU. Cost formulae 401-404 may be used to implement the dataflow of FIG. 3 as follows. FIG. 4 is discussed with reference to FIG. 3.

Cost formulae 401-404 may be separately calculated for each of many alternative placements P1-P2 of FIG. 3. In an embodiment, only the result of cost formula 404 is wanted, but supporting cost formulae 401-403 are calculated to provide input values for cost formula 404. In various embodiments, the result of cost formula 404 may be used by itself as an incremental placement score or may be used as a mathematical term for calculating a placement score.

Cost formulae 401-404 may be calculated in sequence in the ordering that their numbering suggests, which each previous cost formula calculating an output value to be used as an input value of the next cost formula as follows. Cost formula 401 calculates how many OCPUs are needed by new pluggable database instances being added to a database cluster in one alternative placement based on the following terms.

Cdb is one of multiple CDBMSs in the database cluster.

Vm is one of multiple virtual machines in the database cluster.

$OCPU_{[cdb, vm]}$ is how many OCPUs are needed before failover by new pluggable database instance(s) being added to a particular CDBMS in a particular virtual machine.

$1^{st}/2^{nd}$ failover OCPUs is how many OCPUs are needed by those new pluggable database instance(s) after respectively one and two failovers For example as explained earlier herein for placement P2, cost formula 401 calculates that the standby instance of pluggable database D2 in virtual machine W needs no OCPUs while inactive before failover and six OCPUs after failover. Thus, OCPU_new is six for the standby instance as calculated by cost formula 401.

Cost formula 402 calculates how many additional OCPUs should be allocated for each CDBMS and virtual machine. Unlike in cost formula 401, in cost formula 402, $OCPU_{[cdb, vm]}$ is how many OCPUs are the CDBMS and virtual machine already providing. For example as explained earlier herein for placement P2, cost formula 402 calculates that virtual machine Y would need to provide an additional twelve OCPUs but virtual machine W would only need to provide one additional OCPU.

Cost formula 402 calculates a per-CDBMS count of additional OCPUs. Cost formula 403 subtotals those counts per virtual machine. Because FIG. 3 had only one CDBMS per virtual machine, the results of cost formulae 402-403 should be identical.

Cost formula 404 calculates how many additional OCPUs in total does the entire database cluster need to provide. For example as explained earlier herein, placement P2 needs a total of 12+1=thirteen additional OCPUs. Per cost formula 404, the incremental placement cost of placement P2 is thirteen.

5.0 Example Constraint Formulae

FIG. 5 depicts example mathematical constraint formulae 501-504 for automatically disqualifying alternative placements that are infeasible or undesirable. FIG. 5 may reuse some terms that are discussed earlier herein for FIG. 4.

In an embodiment, if an alternative placement violates any of constraint formulae 501-504, then the alternative placement is discarded such as before placement scoring. Constraint formula 501 ensures that CDBMSs hosted by one virtual machine do not collectively overcommit more OCPUs than the virtual machine can provide.

Constraint formula 502 ensures instances of pluggable databases hosted by one CDBMS do not collectively overcommit more OCPUs than the CDBMS can provide before failover. An alternative placement is disqualified if any of constraint formulae 502-504 is violated for any CDBMS, even if not violated for the remaining CDBMSs. Constraint formula 502 uses the following terms.

Pdb is a pluggable database instance hosted by a given CDBMS.

CDB_IDLE_OCPU is processor overhead of the CDBMS itself, even if the CDBMS contains no pluggable databases.

Constraint formula 503-504 ensure instances of pluggable databases hosted by one CDBMS do not collectively overcommit more OCPUs than the CDBMS can provide after a respective first or second failover. After each failover, some CDBMSs may contain more pluggable databases than before failover, which may cause overcrowding that constraint formula 503-504 prevent by disqualifying a placement that would overburden a CDBMS. Terms $FO1_{[pdb]}$ and $FO2_{[pdb]}$ are reduction limits as percentages of a respective first and second failover.

Different pluggable databases may have different FO1 reduction limits and different FO2 reduction limits. Even a pluggable database that has only one instance and cannot itself failover may nonetheless have its own FO1-FO2 reduction limits that contribute to placement planning for when a different pluggable database could failover. A reduction limit of 100% means no reduction. A reduction limit of zero means unlimited reduction.

6.0 Example Density Formulae

FIG. 6 depicts example density formulae 601-605 for calculating processor utilization. Because different virtual machines may have different counts of OCPUs, load balancing does not entail assigning an equal amount of processing to each virtual machine. Instead, load balancing entails distributing processing across the database cluster in proportion to the respective processing capacity of each virtual machine. Such proportional load is referred to herein as density or active density. For an individual virtual machine, lower density is better because that indicates spare capacity for robustness to accommodate failovers and newly added pluggable databases. For an entire database cluster, low variance of density across all virtual machines indicates load balancing for robustness.

Density formula 601 calculates the density of a virtual machine as a ratio of OCPUs allocated to pluggable databases in the virtual machine over the total capacity of the virtual machine in OCPUs. Total capacity includes OCPUs that the virtual machine may hold in reserve for future allocation to a pluggable database or CDBMS. Density formula 601 calculates a density of 50% for a virtual machine that already provides half of its OCPUs to its pluggable databases. Density formula 601 instead calculates a density of 100% for a virtual machine that already provides all of its OCPUs to its pluggable databases. Density formula 602 calculates the density of an entire database cluster as the average density of all virtual machines.

6.1 Bursting

Bursting is a special operational mode of a CDBMS to temporarily provide an extraordinarily high count of OCPUs to a pluggable database instance to satisfy a sudden demand spike for processing by that pluggable database instance. OCPUs held in reserve by a CDBMS or virtual machine can be temporarily allocated to a pluggable database instance during bursting. As discussed earlier herein, a CDBMS may ordinarily provide an extra amount of OCPUs to a pluggable database instance. This extra amount of OCPUs may be temporarily reassigned from one pluggable database to another pluggable database during bursting.

Bursting decreases latency and increases throughput for a pluggable database instance. Multiple instances of a pluggable database in separate CDBMSs may independently burst at a same or different times. The CDBMS automatically decides when bursting for a pluggable database instance should begin and end.

The capacity of a CDBMS to provide bursting is quantified by density formula 603 that calculates a count of OCPUs available for bursting. Term burst_factor[pdb] is an OCPU multiplier that is a same multiplier for all instances of a pluggable database, even though some instances of the pluggable database might not burst at a same time or might not burst at any time. In other words, burst_factor[pdb] is a potential multiplier. For example, if a particular instance of a pluggable database has ten OCPUs before bursting and a 3× bursting factor, then that instance will have 3×10=thirty OCPUs while bursting. Each (e.g. multi-instance) pluggable database may have its own respective burst_factor.

A CDBMS also has its own bursting_factor[cdb] that is a potential multiplier so that a virtual machine can temporarily provide the CDBMS with an extraordinarily high count of OCPUs during bursting. As shown, density formula 603 imposes two limits on bursting in a CDBMS such that processing within the CDBMS cannot: a) exceed its own bursting_factor[cdb] nor b) exceed the aggregate demand for bursting by the pluggable databases in the CDBMS.

Bursting density is increased density during bursting because processor utilization is increased during bursting. Density formula 604 calculates the bursting density of a virtual machine as a ratio of aggregate OCPUs available for bursting across all CDBMSs in the virtual machine over the total capacity of the virtual machine in OCPUs. As shown, the denominator is scaled by a BURST_FACTOR_DEFAULT that is a predefined constant in the database cluster. BURST_FACTOR_DEFAULT should be a real number that is greater than one.

6.2 Optimizing for Bursting

Assuming a higher placement score is better, an increased density of a cluster per density formula 602 may decrease the placement score of an alternative placement. An increased variance of active or bursting densities of all virtual machines per respective density formulae 601 or 604 may decrease the placement score of an alternative placement.

The capacity of a virtual machine to provide bursting is quantified by density formula 605 that calculates a count of OCPUs available for bursting. As shown, density formula 605 imposes two limits on bursting in a virtual machine such that database processing within the virtual machine cannot: a) exceed its own supply of OCPUs nor b) exceed the aggregate demand for bursting in the CDBMSs in the virtual machine.

7.0 Example Formulae for Generation and Comparison of Placements

FIG. 7 depicts example mathematical formulae 701-704 for calculations that facilitate generation and comparison of alternative placements. Scoring formulae 701-702 facilitate scoring of a placement as follows.

Scoring formula 701 calculates resilience that quantifies robustness of a pluggable database instance to accommodate failovers or additions of other pluggable databases. Resilience hierarchically aggregates such that resilience of a CDBMS can be directly calculated from respective resiliences of the pluggable database instances that the CDBMS contains. Likewise, resilience of a virtual machine can be directly calculated from respective resiliences of the CDBMSs that the virtual machine contains. Likewise, resilience of an entire database cluster in an alternative placement can be directly calculated from respective resiliences of all virtual machines. Hierarchical aggregation of resilience is presented in related U.S. patent application Ser. No. 17/334,360.

Assuming a higher placement score is better, an increased resilience of a cluster per scoring formula 701 may increase the placement score of an alternative placement. Scoring formula 701 uses the following terms.

OCPU_int is the minimum count of OCPUs that the pluggable database instance can tolerate, which is referred to as minimum amount G in FIG. 1.

OCPU_red is the actual count of OCPUs that the alternative placement provides, which is referred to as adjusted amount D in FIG. 1.

OCPU_active is the maximum loss of OCPUs that the pluggable database instance can tolerate, which is referred to as maximum reduction F in related U.S. patent application Ser. No. 17/334,360.

Scoring formula 702 is an exemplary way to calculate a placement score of an alternative placement, with a higher score being better. Scoring formula 702 uses the following terms.

Resilience_index is resilience of the entire database cluster per scoring formula 701.

Active_density_deviation is the standard deviation (i.e. variance squared) of the densities of all virtual machines per density formula 601.

Bursting_density_deviation is the standard deviation of the bursting densities of all virtual machines per density formula 604.

Cluster_ocpu_req is the sum of the results of cost formula 403 for all virtual machines.

For the above terms, scoring formula 702 uses weights w1-w4 that are real numbers to respectively multiply with each above term for weighting. As explained above, a higher placement score is better. Likewise, a higher resilience is better. Thus, weight w4 should be positive. Lower is better for the remaining above terms. Thus, weights w1-w3 should be negative.

Combinatorics formulae 703-704 may be demonstrative or may be used to decide how many alternative placements to generate. Combinatorics formula 703 calculates a permutation size that is how many distinct alternative placements could three single-instance pluggable databases be placed into one, two, or three of eight CDBMSs. If instead: a) the three instances are of a same multi-instance pluggable database and b) only one of the three instances is active and the other instances are standbys, then there somewhat fewer alternative placements that can tolerate two failovers in sequence for the multi-instance pluggable database per combinatorics formula 704 that uses the following terms.

n is the count of CDBMSs (i.e. 8).

p is the count (i.e. 3) of pluggable database instances that participate in the sequence of two failovers.

8.0 Example Placement Process

Figure 8:
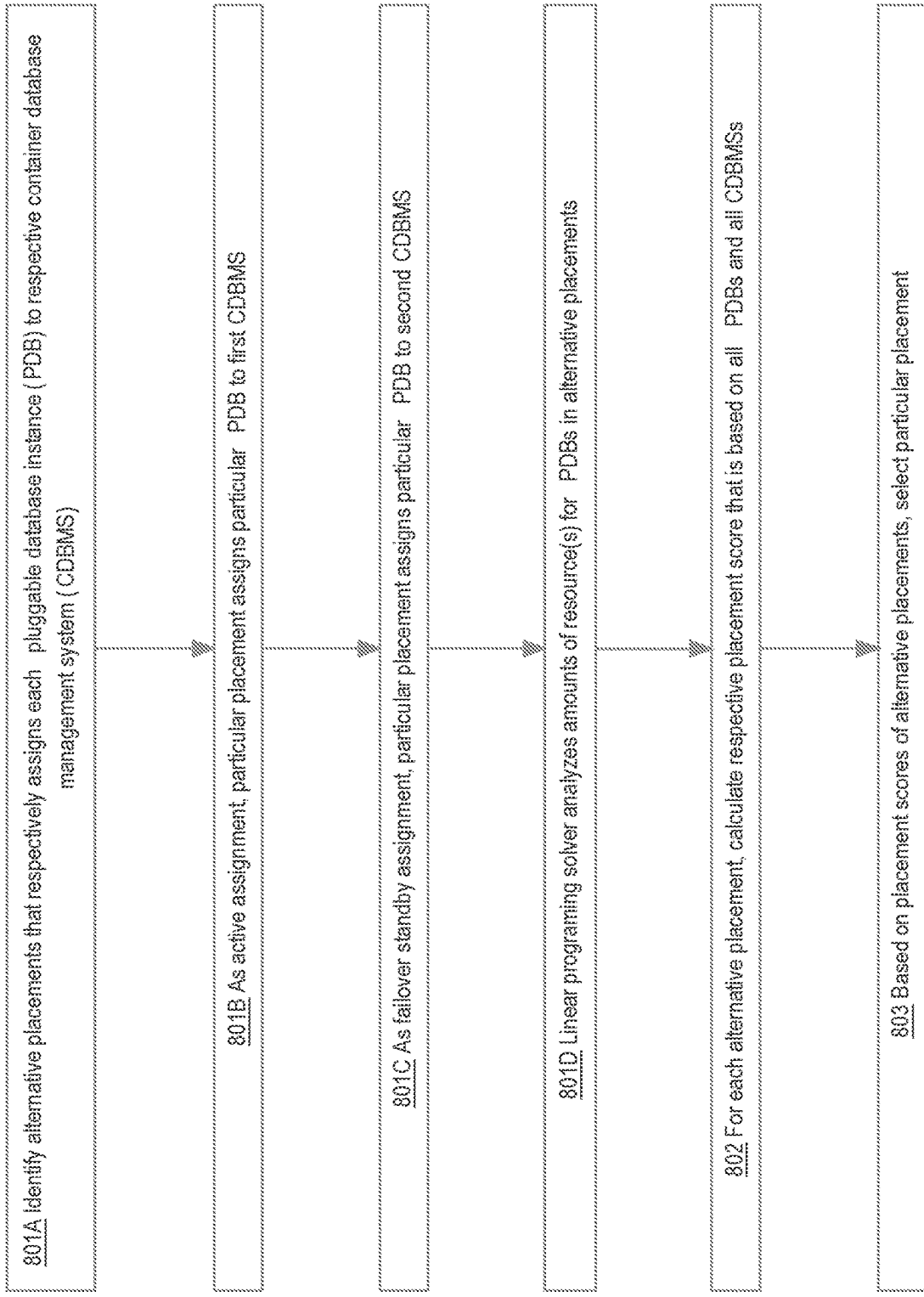
FIG. 8 is a flow diagram that depicts an example computer process to plan ahead for resiliently moving any pluggable database instances between CDBMSs after failover(s)

FIG. 8 is discussed with reference to FIG. 1. FIG. 8 is a flow diagram that depicts an example computer process to plan ahead for resiliently moving any of pluggable databases 151-153 between CDBMSs 141-142 after failover(s), in an embodiment. For example, the database cluster may contain controller computer(s) that perform the process of FIG. 8.

Step 801A identifies alternative placements 161-162 that respectively assigns each of pluggable database instances (PDB) 151-153 to a respective one of CDBMSs 141-142. Various embodiments of step 801A may implement some or all of sub-steps 801B-801D.

Steps 801B-801C cooperate to generate alternative placement 161 in which pluggable database 151 is arranged to survive a failover. Although not shown, alternative placement 161 may place each of two instances (i.e. active and standby) of same pluggable database 151 respectively in separate CDBMSs 141-142 in separate virtual machines 171-172. For example in alternative placement 161, step 801B may assign the active instance of pluggable database 151 into CDBMS 141, and step 801C may assign the standby instance of pluggable database 151 into CDBMS 142.

In step 801D, a linear or non-linear programing solver analyzes amounts of resource(s) for PDBs in alternative placements 161-162. As discussed earlier herein, CDBMSs 141-142 and pluggable databases 151-153 may be associated with amounts of various resources such as quantities A-C and G. The linear or non-linear programing solver quantitatively analyzes such amounts of resource(s) of pluggable databases 151-153 and/or CDBMSs 141-142 to generate alternative placements 161-162 as proposals that, in an embodiment, may entail sub-steps 801B-801C. Some or all of the quantities in constraints 110 and deployment 120 may be accepted as input by a linear or non-linear solver and thus optimized.

For example, some or all of quantities such as A-C and G (and maximum reduction F in related U.S. patent application Ser. No. 17/334,360) of CDBMSs 141-142 and/or 151-153 may be terms in linear or non-linear equations such as one equation per CDBMS, one equation per pluggable database and/or pluggable database instance, and/or one equation per resource. In an embodiment, quantities A-C are inputs, and some or all of amounts D-E and G (and amounts F and H in related U.S. patent application Ser. No. 17/334,360) are intermediate terms that are based on quantities A-C within, and calculated by, the equations.

Such a system of linear or non-linear equations may be solved by a third-party numerical analysis library such as NumPy for python. A system of linear or non-linear equations may have multiple solutions. For example, alternative placements 161-162 may each be based on a respective different solution identified by the linear or non-linear solver for a same set of linear or non-linear equations. Due to constrain formulae 501-504, the linear or non-linear solver may: a) avoid generating alternative placements that would violate at least one constraint formula and/or b) discard invalid alternative placements whose violation of at least one constraint formula is not detected until after the invalid alternative placements are generated. In an embodiment, a bin packing algorithm is used instead of, or in addition to, a linear or non-linear programming solver.

In an embodiment, step 801D does not entail linear or non-linear programing and instead uses a different optimization model to discover a same or similar solutions. An optimization model may be a numerical regression such as a linear or non-linear regression. In an embodiment, the numerical regression is a machine learning (ML) model such as a decision tree or random forest, a K nearest neighbor (KNN) model, a support vector machine (SVM), or an artificial neural network (ANN).

For each alternative placement, step 802 calculates a respective placement score that is based on all PDBs and all CDBMSs, such as placement score E for alternative placement 162 that may or may not be based on scoring formula 702.

Based on placement scores of alternative placements 161-162, step 803 selects alternative placement 161 if it has the better placement score. Step 803 may or may not also reconfigure the database cluster to implement alternative placement 161, which may entail any of: a) adding or removing pluggable database instance(s), CDBMS(s) and/or virtual machine(s) and b) increasing, decreasing, or reassigning allocated resources and/or spare resources. If step 803 does not reconfigure the database cluster, then alternative placement 161 may be retained for use after a failover.

9.0 Hierarchical Placement

In an exemplary embodiment, freedom of placement occurs for CDBMSs 141-142 in a somewhat similar way as for pluggable databases. For example, a CDBMS may be moved or cloned into a different virtual machine. In alternative placement 161, any of CDBMSs 141-142 are added, moved into, or remain in a respective one of virtual machines 171-172. Assignment of a CDBMS may be in a same or different virtual machine in other alternative placement 162.

10.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

11.0 Pluggable Database and Container Database System Overview

Database consolidation involves distributing and sharing computing resources among multiple databases. Databases may be consolidated using a container database management system. A consolidated database, such as a multitenant container database (CDB), includes one or more pluggable databases (PDBs).

A container database includes a data dictionary, which comprises metadata that defines database objects in the container database. For example, the data dictionary for a given CDB will include metadata describing each PDB that is contained in the given CDB, including the database objects included in each PDB. Further, each pluggable database includes a PDB-specific database dictionary that comprises metadata that defines database objects contained in the pluggable database. Database objects include tables, table columns, indexes, files, tablespaces, data types, users, user privileges, and storage structures used for storing database object data, etc.

A container database may manage multiple pluggable databases and a given database server instance may manage and serve those pluggable databases from the container database. As such, a given container database allows multiple pluggable databases to run on the same database server and/or database server instance, allowing the computing resources of a single database server or instance to be shared between multiple pluggable databases. In a container database management system, each pluggable database may be opened or closed in the container database independently from other pluggable databases.

An application may access a pluggable database by establishing a database session on the container database management system for that pluggable database, where a database session represents the connection between an application and the container database management system for accessing the pluggable database. A database session is initiated for a pluggable database by, for example, transmitting a request for a new connection to the container database management system, the request specifying the pluggable database. In response to such a request, the container database management system establishes the requested database session. A container database management system may host multiple database sessions, each database session being for one of multiple pluggable databases.

A given container database is configured based on the requirements of those database management system (DBMS) features that are applicable to the container database. A DBMS feature that is applicable to a container database is one that interacts with or influences the container database and, as such, requires a certain configuration of the container database. DBMS features that may be applicable to a given container database, comprise one or more of: a version of the DBMS that manages the container database (including major version, minor version, and/or patch level); optional features that may be installed or implemented for a container database (such as data encryption, a feature that allows multiple levels of data restriction within areas of the database, localization enablement); common users that exist in the container database; independently-installed patches that have been installed for the DBMS that manages the container database; etc.

The configuration of a CDB encompasses aspects of the CDB that are adjusted based on the DBMS features that are applicable to the CDB. Such aspects of the CDB comprise one or more of: data stored within or the structure of the database objects stored in the pluggable databases of the CDB; the layout or content of the underlying operating system files of the CDB; the number of background processes required by the CDB; identifiers associated with the CDB; variables required for CDB functionality; initialization parameters; a character set with which data in the CDB is encoded; time zones supported by the CDB; standard database block size; tablespace settings; undo settings; services supported by the CDB; special features implemented for the CDB; database server instance cluster support for the CDB; etc.

Pluggable databases may be "plugged in" to a container database, and may be transported between database servers and/or database management systems. A database server instance plugs a pluggable database into a container database by including metadata describing the pluggable database in the database dictionary of the container database and by initiating management of the pluggable database as part of the container database. Any number of the aspects of the configuration of a container database, into which a particular pluggable database is plugged, affects the pluggable database.

When a pluggable database is moved to a destination container database from a source container database, where the destination and source container databases have the same configuration, the pluggable database need not be reconfigured prior to making the pluggable database available to operations at the destination container database. However, the source and destination container databases of a relocating pluggable database are not always configured for the same set of DBMS features. When a pluggable database is moved to a destination container database that has a different configuration than the source container database of the pluggable database, the relocated pluggable database is reconfigured to conform to the configuration of the destination container database, which allows the relocated pluggable database to be compatible with the DBMS features that are applicable to the destination container database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
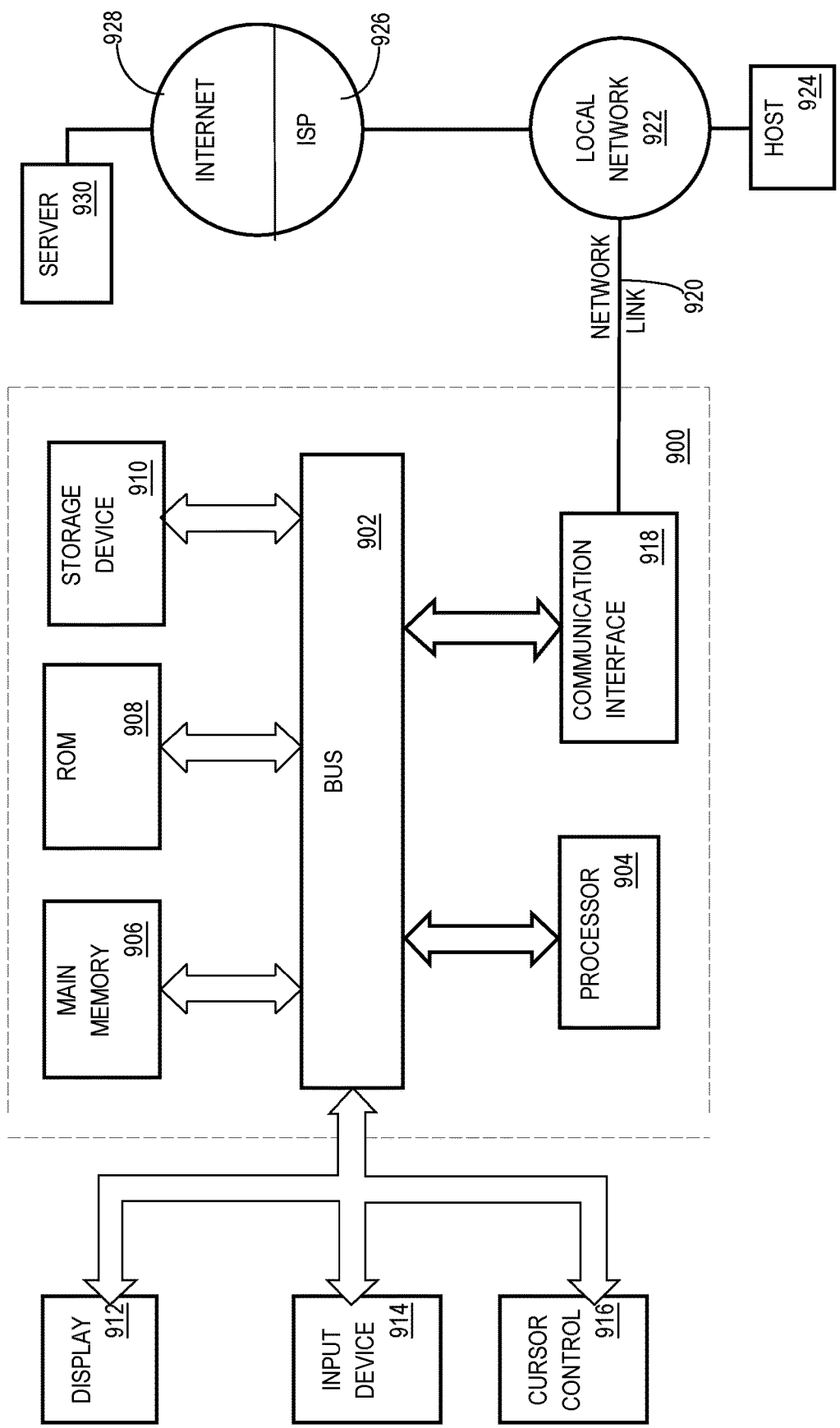
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
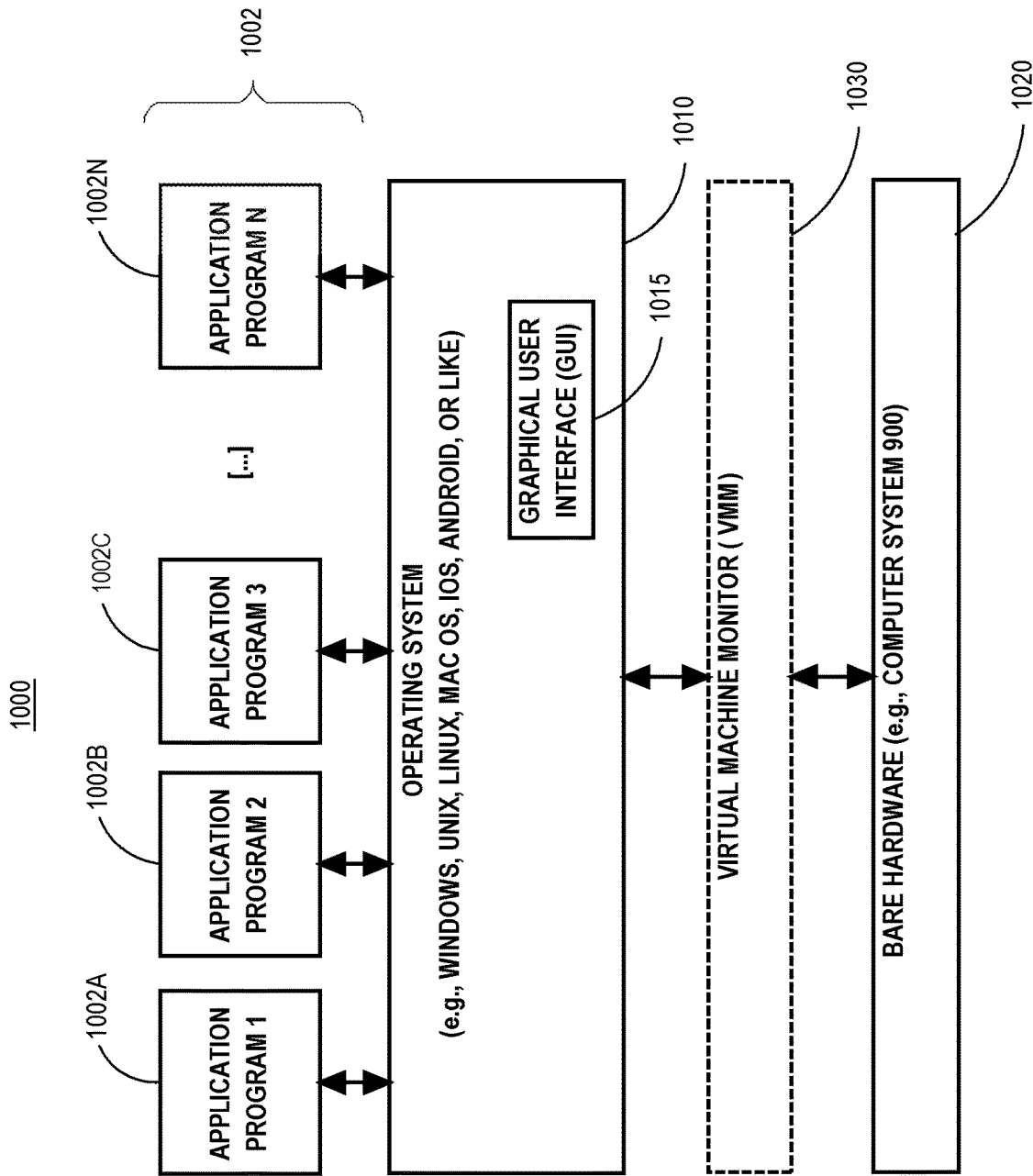
FIG. 10 is a block diagram that illustrates a basic software system that may be employed for controlling the operation of a computing system.

FIG. 10 is a block diagram of a basic software system 1000 that may be employed for controlling the operation of computing system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 1000 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a plurality of alternative placements, wherein each alternative placement of the plurality of alternative placements respectively assigns each pluggable database instance (PDB) of a plurality of PDBs to a respective container database management system (CDBMS) of a plurality of CDBMSs that includes a particular CDBMS, wherein the plurality of alternative placements includes a particular placement that assigns a first PDB of the plurality of PDBs and a second PDB of the plurality of PDBs to the particular CDBMS;
   for each alternative placement of the plurality of alternative placements, calculating a respective placement score that is based on the plurality of PDBs and the plurality of CDBMSs, wherein the placement score of the particular placement is based on at least one of:
      a respective minimum amount of a resource for each of the first PDB and the second PDB, and
      a respective resilience score of each of the first PDB and the second PDB;
   detecting that the particular placement has a highest placement score of the plurality of alternative placements; and
   collocating, based on the particular placement, the first PDB and the second PDB in the particular CDBMS;
   wherein the method is performed by one or more computers.

2. The method of claim 1 wherein:
   the method further comprises hosting, by a respective virtual machine of a plurality of virtual machines, each CDBMS of the plurality of CDBMSs;
   said calculating the placement score of the particular placement is further based on, for each virtual machine of the plurality of virtual machines, a respective ratio of a) a sum of said minimum amounts of said resource for the plurality of PDBs to b) an available amount of said resource from the virtual machine.

3. The method of claim 2 wherein said calculating the placement score of the particular placement is further based on a standard deviation of said ratios for the plurality of virtual machines.

4. The method of claim 1 wherein the resource is at least one selected from a group consisting of network bandwidth and a fraction of a processor core.

5. The method of claim 4 wherein:
   the method further comprises:
      hosting, by a respective virtual machine of a plurality of virtual machines, each CDBMS of the plurality of CDBMSs, and
      hosting, by a respective computer of a plurality of computers, each virtual machine of the plurality of virtual machines;
   said processor core resides in a computer that is not in the plurality of computers.

6. The method of claim 1 wherein:
   the method further comprises hosting, by a respective virtual machine of a plurality of virtual machines, each CDBMS of the plurality of CDBMSs;
   said calculating the placement score of the particular placement is further based on, for each virtual machine of the plurality of virtual machines, a respective bursting density;

at least one selected from a group consisting of:
the bursting density of a particular virtual machine of the plurality of virtual machines is based on at least one of the plurality of PDBs,
the bursting density of a particular virtual machine of the plurality of virtual machines is based on at least one of the plurality of CDBMSs, and
the bursting density of a particular virtual machine of the plurality of virtual machines is based on an available amount of a resource from the particular virtual machine.

7. The method of claim 1 further comprising a linear or non-linear programing solver analyzing amounts of one or more resources for the plurality of PDBs for the plurality of alternative placements.

8. The method of claim 1 wherein the particular placement assigns each CDBMS of the plurality of CDBMSs to a respective virtual machine of a plurality of virtual machines.

9. The method of claim 1 wherein:
the plurality of PDBs does not include a new PDB that is not already assigned to a CDBMS of the plurality of CDBMSs;
respective assignments of the plurality of PDBs are identical in the plurality of alternative placements;
each alternative placement of the plurality of alternative placements assigns the new PDB to a different CDBMS of the plurality of CDBMSs.

10. The method of claim 1 wherein:
the particular placement assigns each PDB of the plurality of PDBs to a respective CDBMS of the plurality of CDBMSs comprises:
as an active assignment, the particular placement assigns a particular PDB of the plurality of PDBs to a first CDBMS of the plurality of CDBMSs, and
as a failover standby assignment, the particular placement assigns the particular PDB to a second CDBMS of the plurality of CDBMSs;
said calculating the placement score for the particular placement is further based on at least one selected from a group consisting of the active assignment and the failover standby assignment.

11. One or more computer-readable non-transitory media storing instructions that, when executed by one or more processors, cause:
identifying a plurality of alternative placements, wherein each alternative placement of the plurality of alternative placements respectively assigns each pluggable database instance (PDB) of a plurality of PDBs to a respective container database management system (CDBMS) of a plurality of CDBMSs that includes a particular CDBMS, wherein the plurality of alternative placements includes a particular placement that assigns a first PDB of the plurality of PDBs and a second PDB of the plurality of PDBs to the particular CDBMS;
for each alternative placement of the plurality of alternative placements, calculating a respective placement score that is based on the plurality of PDBs and the plurality of CDBMSs, wherein the placement score of the particular placement is based on at least one of:
a respective minimum amount of a resource for each of the first PDB and the second PDB, and
a respective resilience score of each of the first PDB and the second PDB;
detecting that the particular placement has a highest placement score of the plurality of alternative placements; and
collocating, based on the particular placement, the first PDB and the second PDB in the particular CDBMS.

12. The one or more computer-readable non-transitory media of claim 11 wherein:
the instructions further cause hosting, by a respective virtual machine of a plurality of virtual machines, each CDBMS of the plurality of CDBMSs;
said calculating the placement score of the particular placement is further based on, for each virtual machine of the plurality of virtual machines, a respective ratio of a) a sum of said minimum amounts of said resource for the plurality of PDBs to b) an available amount of said resource from the virtual machine.

13. The one or more computer-readable non-transitory media of claim 11 wherein the resource is at least one selected from a group consisting of nonvolatile storage, random access memory (RAM), network bandwidth and a fraction of a processor core.

14. The one or more computer-readable non-transitory media of claim 11 wherein:
the instructions further cause hosting, by a respective virtual machine of a plurality of virtual machines, each CDBMS of the plurality of CDBMSs;
said calculating the placement score of the particular placement is further based on, for each virtual machine of the plurality of virtual machines, a respective bursting density;
at least one selected from a group consisting of:
the bursting density of a particular virtual machine of the plurality of virtual machines is based on at least one of the plurality of PDBs,
the bursting density of a particular virtual machine of the plurality of virtual machines is based on at least one of the plurality of CDBMSs, and
the bursting density of a particular virtual machine of the plurality of virtual machines is based on an available amount of a resource from the particular virtual machine.

15. The one or more computer-readable non-transitory media of claim 11 wherein said instructions further cause a linear or non-linear programing solver analyzing amounts of one or more resources for the plurality of PDBs for the plurality of alternative placements.

16. The one or more computer-readable non-transitory media of claim 11 wherein the particular placement assigns each CDBMS of the plurality of CDBMSs to a respective virtual machine of a plurality of virtual machines.

17. The one or more computer-readable non-transitory media of claim 11 wherein:
the plurality of PDBs does not include a new PDB that is not already assigned to a CDBMS of the plurality of CDBMSs;
respective assignments of the plurality of PDBs are identical in the plurality of alternative placements;
each alternative placement of the plurality of alternative placements assigns the new PDB to a different CDBMS of the plurality of CDBMSs.

18. The one or more computer-readable non-transitory media of claim 11 wherein:
the particular placement assigns each PDB of the plurality of PDBs to a respective CDBMS of the plurality of CDBMSs comprises:
as an active assignment, the particular placement assigns a particular PDB of the plurality of PDBs to a first CDBMS of the plurality of CDBMSs, and as a failover standby assignment, the particular placement assigns the particular PDB to a second CDBMS of the plurality of CDBMSs;

said calculating the placement score for the particular placement is further based on at least one selected from a group consisting of the active assignment and the failover standby assignment.

* * * * *

UNITED STATES PATENT AND TRADEMARK OFFICE
CERTIFICATE OF CORRECTION

| | | |
|---|---|---|
| PATENT NO. | : 11,994,963 B2 | |
| APPLICATION NO. | : 17/577729 | |
| DATED | : May 28, 2024 | |
| INVENTOR(S) | : Muthukrishnan et al. | |

It is certified that error appears in the above-identified patent and that said Letters Patent is hereby corrected as shown below:

In the Specification

In Column 14, Line 3, delete "failovers" and insert -- failovers. --, therefor.

In the Claims

In Column 28, Lines 17-18, in Claim 13, after "of" delete "nonvolatile storage, random access memory (RAM),".

Signed and Sealed this
Eighth Day of October, 2024

Katherine Kelly Vidal
*Director of the United States Patent and Trademark Office*